United States Patent [19]

Wyman et al.

[11] 4,327,793
[45] May 4, 1982

[54] BICYCLE TIRE WITH COMPRESSION AMPLIFICATION

[76] Inventors: Ransome J. Wyman, 821 Camino Colibri, Calabasas, Calif. 91302; Richard A. Alshin, 5565 St. Irmo Walk, Long Beach, Calif. 90803; Charles H. Gilbert, 2101 Camino Rey, Fullerton, Calif. 92633

[21] Appl. No.: 906,691

[22] Filed: May 16, 1978

[51] Int. Cl.³ .............................................. B60C 7/00
[52] U.S. Cl. ..................................... 152/323; 152/312
[58] Field of Search ............. 152/381.2, 381.3, 381.4, 152/381.6, 379.1, 379.2, 310, 311, 312, 323, 399

[56] References Cited

U.S. PATENT DOCUMENTS 365,091  6/1887  Owen ............................ 152/379.1 X
4,127,166  11/1978  Wyman ............................ 152/312 X

FOREIGN PATENT DOCUMENTS 2255 of 1905 United Kingdom ................. 152/323

*Primary Examiner*—Robert B. Reeves
*Assistant Examiner*—Gene A. Church
*Attorney, Agent, or Firm*—K. H. Boswell

[57] ABSTRACT

A solid, monolithic bicycle tire made of urethane rubber with a cured hardness of from 60 to 70 Durometer A. The tire is formed with a pair of laterally spaced bead shoulders that seat on the bead seats of the wheel rim, and is generally triangular in cross-section, with radially outwardly converging, slightly concave side walls that merge into a relatively narrow tread section. A circumferential, arch-shaped tunnel is formed in the inner side of the tire between the bead shoulders, and the material between the tunnel and the converging outer surfaces forms narrow, inwardly inclined side walls that are compressed when pressure is applied radially inwardly against the tread. The inclination of the side walls results in a substantial amplification of the deflection of the tire under impact loads, as compared to the deflection of similar-thickness side walls that are not inclined, but instead, are parallel to one another. As the tire is compressed under load, the side walls tend to collapse inwardly, causing the bead shoulders to grip the wheel rim with increasing force, thereby resisting any tendency of the bead shoulders to climb up over the edge of the wheel rim. The tire is also held firmly on the rim by means of a circumferential bead-locking insert that is placed in the bottom of the wheel rim before the tire is mounted. Foot extensions at the bottom edges of the tire side walls are then pressed down into the space between the wheel rim and the insert, and the insert acts to hold the foot extension and bead shoulder firmly against the wheel rim so as to resist any tendency of the foot extension or bead shoulder to climb.

4 Claims, 3 Drawing Figures

BICYCLE TIRE WITH COMPRESSION AMPLIFICATION

BACKGROUND OF THE INVENTION

The present invention pertains generally to vehicle tires, and more particularly to a new and improved form of tire of the type used primarily on bicycles, wheel chairs, and the like.

Heretofore, the only type of bicycle tire available on the market has been the pneumatic tire, which is constructed much like an automobile tire, with a cord carcass and steel wire beads. Most bicycle tires are of the tube type, and generally, two types of tubes are available: the relatively thin, regular tube, and the considerably heavier, so-called thorn-proof tube.

These pneumatic bicycle tires have a number of disadvantages. They are subject to blow-outs, which cause serious safety hazards. Because of the thin tread, they wear out quickly and have a relatively short service life. Also, as a result of the thin tread, they are readily punctured by thorns and/or small pieces of glass or nails. They lose air and become under-inflated, and as a result they become extremely difficult to ride. It is necessary to carry a tire pump to keep the tires properly inflated, or else make frequent trips to service stations to inflate the tires with their compressed air. The tires are easily cut, and cannot be repaired. They are expensive to manufacture because of the fact that a considerable amount of skilled labor and expensive tooling is required to make the tire. And finally, they do not contribute to the visibility of the bicycle, except when reflective strips are cemented to the side walls of the tires.

There have been attempts to overcome some of the above disadvantages by filling the tires with a mixture of two liquid urethane resins, which react, or cure, to form a solid, resilient elastomeric tire. Such elastomeric tire fillings have been used successfully in automobile tires for a number of years, and two examples of this material are Permatire, made by Arnco, of Marina del Rey, Calif., and TireFill, made by Indpol, of Cucamonga, Calif. While bicycle tires filled solidly with urethane rubber eliminate some of the disadvantages of pneumatic tires, such as blow-outs, slow leaks, and underinflation, they have a number of disadvantages of their own. One serious disadvantage is that the urethane-filled tire is extremely heavy, weighing up to five or six pounds per tire, which makes a total weight penalty of 10 to 12 pounds for the bicycle. This is because it takes from 3 to 4 pounds of urethane rubber to fill the tire. Another disadvantage is that the ride is harder, and rolling resistance is increased. Ride comfort and rolling resistance are mutually antagonistic quantities, and it is necessary to make a compromise between them, which usually results in a fairly hard ride with a moderate amount of rolling resistance.

A more serious problem with filled tires is that they cannot be removed from the wheel rims for spoke repairs or adjustment, without damaging the tire. This is because the tire is filled all the way to the full depth of the rim, which greatly reduces the minimum diameter that has to be pulled over the rim of the wheel. As a result, the only way the tire can be removed is by cutting it, and this destroys the tire.

Another major problem with filled bicycle tires is that wheel rims are easily damaged on sharp impact, due to the incompressibility of the fill material, which extends directly to the rim. The solid fill material has no place to go, and therefore a sharp impact blow against the tire causes a highly concentrated stress to be applied directly to the rim, causing damage.

The tire filling process is slow, difficult, expensive and unreliable when applied to bicycle tires. It requires equipment to handle liquid urethane and operators well-trained in handling the polymers to do this filling job right. Bike shops are not set up to do such jobs, and most of them would decline to go into the tire-filling business because of the many problems and relatively small volume of business.

Recently, efforts have been made to develop a solid, monolithic tire of urethane elastomer having a tunnel on the inside to allow the tire to compress under impact loads. However, this has proved to be a difficult thing to achieve, as a tire made of a urethane soft enough to give a comfortable ride, turns out to have unsatisfactory resistance to wear and cuts, while urethane hard enough to give good resistance to wear and cuts gives a hard, uncomfortable ride.

One of the more difficult problems with a solid, monolithic tire of urethane elastomer having a tunnel on the inside, is the tendency of the tires to come off the rims, even though they are glued to the rim with an adhesive. This is due, in part, to the fact that the only thing holding the tire bead shoulders against the rim is the adhesive bond, which is frequently less than perfect owing to the difficulty of getting a uniform film of adhesive on the mating surfaces. Another contributing factor is the elasticity of the unreinforced elastomer, which allows the tire to stretch under certain loading conditions. The problem is particularly acute when a side thrust is applied to the tire, as when cornering or bumping against a curb.

SUMMARY OF THE INVENTION

The primary object of the present invention is to provide a bicycle tire which overcomes all of the disadvantages of pneumatic bicycle tires, as well as the disadvantages of filled bicycle tires, and which has none of the shortcomings of prior solid urethane tires with a tunnel on the inside.

More specifically, it is an object of the invention to provide a solid, monolithic bicycle tire of urethane elastomer of approximately 70 Durometer A, with no tire bead or fabric reinforcement, which has excellent ride quality, comparable to a pneumatic tire, and rolling resistance equal to that of a properly inflated pneumatic tire. To obtain this superior ride quality, the tire is made with a novel cross-sectional configuration, including an arch-shaped tunnel and converging, slightly concave, side walls that provide a unique effect of compression amplification, that allows the tire to deflect under impact loads to a far greater extent than would otherwise be the case.

Another important object of the invention is to provide a tire of the type described, together with an associated bead-locking insert, which cooperate to lock the tire to the wheel rim so that it is virtually impossible for the tire to come off the rim under any normal load condition. A flexible adhesive may also be used to bond the bead shoulders to the wheel rim so as to provide additional holding power, but the primary purpose of the adhesive is to prevent the tire from "growing" in diameter by centrifugal force at high speed.

A further object of the invention is to provide a tire that is lightweight, long-lasting, easily removable and replaceable, fits most standard size wheel rims, and is easily repairable. The tread portion of the tire is relatively thick, and a substantial portion of the tread thickness can be utilized for wear purposes. The urethane elastomer can be pigmented with Day-Glo pigments for improved bicycle visibility, for safety. The tire is lighter in weight than a pneumatic tire with tube, and can easily be stretched over the wheel rim to mount the tire or remove it. This allows for easy removal of the tire for spoke adjustment and repair.

Finally, the tire is easily manufactured with a minimum of hand labor, using liquid, room-temperature-curing elastomers. Automatic machinery can be used to make the tires, as there is no hand lay-up required. The room-temperature cure material requires little or no energy, and the tire can come out of the mold in as little as 3 to 5 minutes.

These and other objects and advantages of the present invention will become apparent to those skilled in the art from the following detailed description of the preferred embodiment thereof, with reference to the accompanying drawings.

DESCRIPTION OF THE PREFERRED EMBODIMENT

Figure 1:
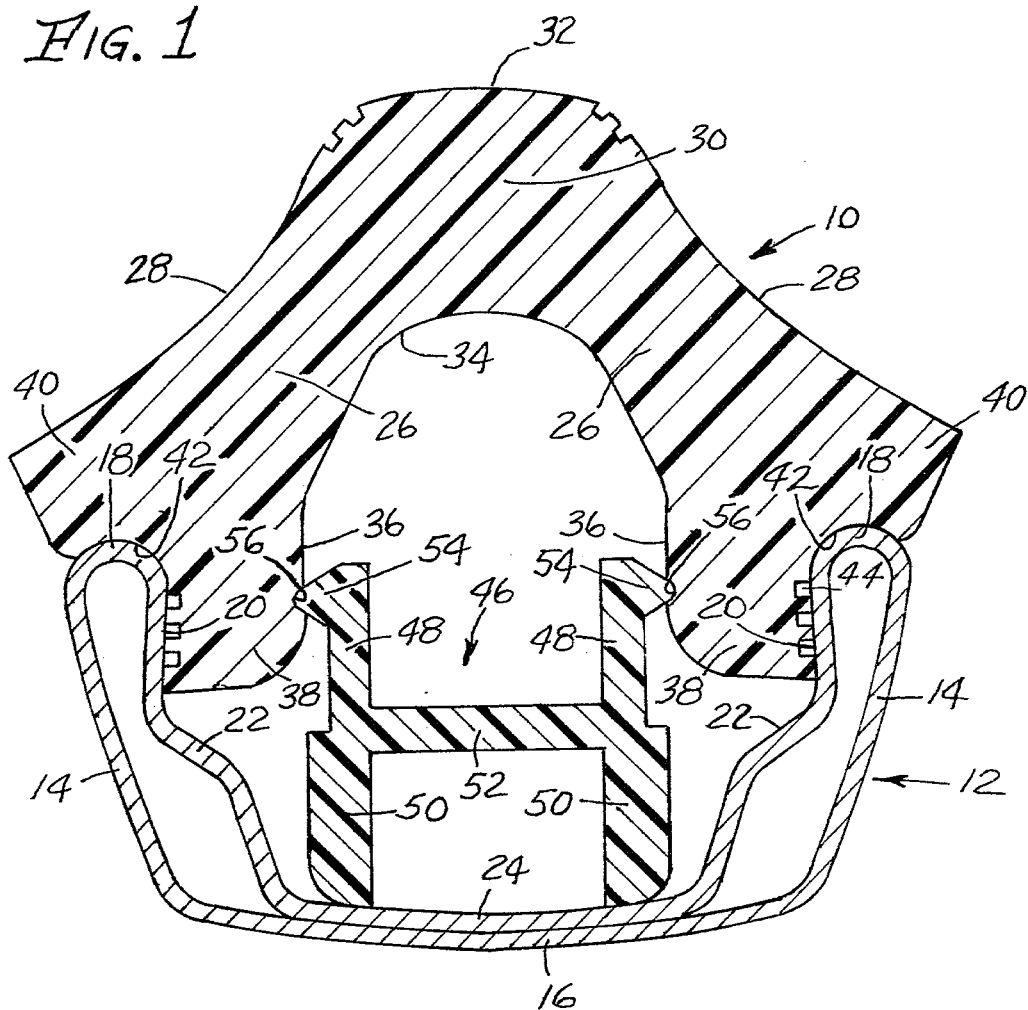
FIG. 1 is a cross-sectional view of a bicycle tire embodying the invention, showing the tire mounted on a conventional wheel rim.

In the drawings, a tire embodying the invention is shown in FIG. 1 and designated in its entirely by the reference numeral 10. The tire is shown mounted on a bicycle wheel rim 12. The wheel rim 12 is conventional, and is usually made of sheet-metal, roll-formed to the configuration shown in the drawings. The outer skin of the wheel rim forms flanks 14, which merge into a crown 16 that forms the inside periphery of the wheel. At their outer edges, the flanks 14 are rolled inwardly to form a bead flange 18, which merges into the inner side walls 20 of the rim. Sidewalls 20 terminate in shoulders 22 which merge with a shallow channel 24 forming the bottom of the wheel rim.

The tire 10 is a solid, monolithic casting of urethane rubber, with a cured hardness of 70 Durometer A. The tire body is made by pouring liquid urethen resin into a mold, said resin being catalyzed to cure in 3 to 5 minutes at room temperature (i.e. from 80° to 100° F.), after which the tire is removed from the mold as a finished product, with no further processing being required.

The cross-sectional configuration of the tire is quite unconventional, as is immediately apparent from the drawings. Basically V-shaped in cross-section, the tire has sloping, outwardly converging side walls 26, the outer surfaces 28 of which are concave, and these side walls come together to form a narrow outer portion 30 having a tread pattern 32 on its outer peripheral surface.

Formed in the inside of the tire body 10 is an arch-shaped tunnel 34, the lower side surfaces 36 of which are substantially parallel to one another. At the bottom extremity of the tunnel the sides turn outwardly to form the undersides of beads 38.

At their lower ends, the side walls 26 thicken and divide, forming a shoulder 40 that juts out over the bead flange 18, and the bead 38 that extends down into the wheel rim 12 in contact with side wall 20. Between the shoulder 40 and bead 38 is a curved bead shoulder 42 that seats on the bead flange 18. Three concentric grooves 44 are formed in the outer surfaces of the beads 38, and these provide annular cavities between the side wall 20 and bead 38 to receive liquid adhesive cement so as to form cement rings of a predetermined thickness. The grooves 44 serve to prevent the cement from squeezing out, and relatively thick rings of elastic adhesive allow for a greater amount of stretch of the cement before it yields, and in the process of stretching, it spreads the load over a wider area. As a result, a low bonding strength adhesive can be used, which still exhibits an adequate overall bonding strength for bonding the tire to the rim. The cement may be applied after the tire has been mounted on the rim by merely pressing the sides of the tire inwardly to open up a slight gap between the bead 38 and side wall 20, and squeezing a liquid cement from a tube into the space, repeating the process all the way around the tire, on both sides thereof. The use of cement is primarily to prevent the tire from "growing" in diameter by centrifugal force at high speeds, and the majority of bike riders will not find it necessary to use cement, as the tire does not require the cement to hold it on the rim under normal conditions.

The tire 10 is prevented from pulling off the rim 12 by means of a bead lock insert 46, which is placed in the bottom of the wheel rim before the tire is mounted. The insert 46 is preferably made of a resilient plastic, such as PVC, polypropylene, or nylon, and is preferably H-shaped in cross-section, with upper flanges 48, lower flanges 50, and a transverse web 52. Projecting laterally outward from the top edges of upper flanges 48 on the outside thereof are ridges 54, which seat in shallow grooves 56 formed in the tunnel sides 36. The top sides of the ridges 54 slope downwardly, as shown in FIG. 1, to facilitate pushing the beads 38 down into the space between the upper flanges 48 of the insert and the side walls 20 of the wheel rim.

The insert 46 may conveniently be formed by extrusion to make a continuous helical coil which is then cut into lengths to form split rings, each of which is adapted to fit into a wheel rim, as shown, with its two ends spaced only a fraction of an inch apart. These ends are joined together by any suitable means (not shown) to hold the insert in the rim with the bottom edges of lower flanges 50 seated on the channel 24.

To mount the tire on the wheel rim, the tire 10 is first lubricated with soft soap, or soapy water, and is then stretched over the rim, pulling the beads 38 down into the spaces between the upper flanges 48 and the side walls 20. The material of insert 46 is resilient, and upper flanges 48 yield inwardly to allow the beads 38 to pass over the ridges 54, until the ridges 54 snap down into the grooves 56. The beads 38 are then held firmly against the side walls 20 by the upper flanges 48 of the insert, and this prevents the beads from climbing up over the bead flange 18. If it is desired to cement the beads to the side walls 20, this can be done after first rinsing the tire and rim and allowing it to dry.

Figure 2:
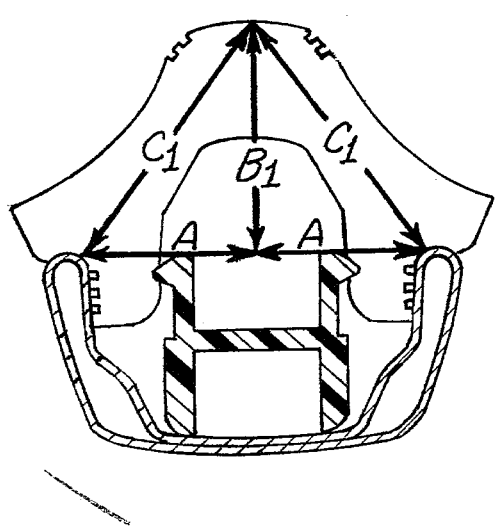
FIG. 2 is a smaller view of the same, showing, schematically, the force vectors that transfer light loads to the wheel rim.
Figure 3:
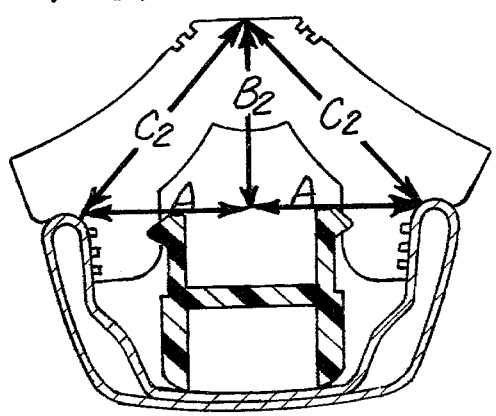
FIG. 3 is a view similar to FIG. 2, but showing how the compression amplification functions.

What makes this tire design unique is the compression amplification that is obtained. The term "compression amplification" might be defined as the deflection of the tread surface 32 under load, as compared to the apparent compression of the side walls 26. Actually, urethane elastomer is not compressible, but instead, distorts under compression, and then regains its original shape when the load is removed. Thus, when the side walls 26 are placed under a compressive load, the height of the side wall shortens, and its width thickens. FIGS. 2 and 3 illustrate this point. In FIG. 3, a triangle formed by sides A, $B_1$ and $C_1$ represents the force vectors involved. Side A is fixed in dimensions, by the essentially unyielding sides of the wheel rim. Side $B_1$ represents the unloaded height of the tire, and side $C_1$ represents the uncompressed sidewall 26 of the tire. In FIG. 3, dimension $B_2$ shows the height of the tire when heavily loaded, and side $C_2$ represents the compressed sidewall 26 of the tire. The difference between $B_1$ and $B_2$ represents the total deflection (i.e., compression) of the tire under load for an amount of compression of the side walls 26 represented by $C_1-C_2$.

The dimension B is not directly supported, but is actually supported at an angle by the two force vectors C, which are determined largely by the angle of the sidewalls 26. Movement of B is solely by compressing or distorting sidewalls 26. The total deflection of the tread under may be represented by $\Delta B$. By inspection of FIGS. 2 and 3, it is seen that $B_1 = \sqrt{(C_1-A)(C_1+A)}$ and $B_2 = \sqrt{(C_2-A)(C_2+A)}$. With the present invention, tire flotation is controlled by the compression of the B dimension, and the percent change of B under load is governed by the percent of change equation:

$$\% \text{ change of } B = \frac{\Delta B}{.01B_1} = \frac{B_1 - B_2}{.01B_1} = \frac{\sqrt{(C_1-A)(C_1+A)} - \sqrt{(C_2-A)(C_2+A)}}{.01B_1}$$

If C forms a 45° angle with respect to A, then for 10% movement in C, B compresses a 22% of its original unloaded dimension. By lowering the angle, amplification is increased. Compression amplification allows the use of moderately compressible, high strength elastomers. These materials would be too hard to provide good ride with solid construction. With the tunnel construction and compression amplification, comfort and flotation similar to pneumatic construction is achieved.

One factor that contributes to the effectiveness of the tunnel construction and compression amplification is the concave sides 28 of the tire. These concavities cause the side walls 26 to collapse inwardly as they compress, thereby lowering the angle between C and A and increasing the compression amplification. Another fortunate result is that the tire bead 38 and bead shoulder 42 press with increasing pressure against their respective rim surfaces as the compression load on the tread increases, thereby causing the tire to resist any tendency to climb over the bead flange 18.

Variables that can be changed to vary the flotation quality of the tire are: (1) The elastomer can be made harder or softer to give a desired physical property, such as wear resistance, without sacrificing flotation; (2) The slope of C can be varied to increase or decrease the amount of compression amplification; and (3) The dimension A can be made variable by using spring-loaded restraint on the tire beads.

The advantages of the invention are many. Probably most important to the bicycle owner is the fact that there is no possibility of blow-outs, flat tires, or underinflation. The tire has excellent ride quality, comparable to a pneumatic tire, with about the same rolling resistance as the latter. Cuts may be easily repaired with silicone bathtub caulk, or other suitable adhesive, which is needed merely to hold the cut edges together to prevent the cut from propagating further. No other tire can be repaired so easily. The tire has a thick usable tread surface for extended tire wear. It can be easily removed from the wheel rim for spoke adjustment and repair, and then replaced. The compression amplification principle allows the tire to absorb the energy of a severe impact over a much wider range than would be possible with a solid tire, and as a result, rim damage will be no greater than with conventional pneumatic bike tires. And finally, the bead-locking insert cooperates with the tire beads to hold the tire firmly on the rim at all times, despite excessive impact loads or severe side-thrust loads.

While we have shown and described in considerable detail what we believe to be the preferred form of the invention, it will be understood by those skilled in the art that the invention is not limited to such details, but might take various other forms within the scope of the claims. For example, the invention has been described in particular as a bicycle tire, but it is not limited solely to bicycle tires, as it might be used with any other vehicle tire. In particular, tires used on wheel chairs or carts might be made in accordance with the invention, as well as industrial and agricultural tires.

What we claim is:

1. A vehicle tire for use on a wheel rim having a pair of laterally spaced bead flanges and side walls, and a circumferential channel forming the bottom of the rim, said tire comprising:

a solid, monolithic tire body made of urethane elastomer and having a circumferentially extending, arch-shaped tunnel formed on the inside of the tire body, said tire body having inclined side walls that converge outwardly to form a V-shaped cross-section, the apex of which forms the tread portion of the tire;

said side walls terminating in a thickened portion forming a bead shoulder that seats on the bead flange of the wheel rim and juts over the top edge thereof, and said thickened portion also forming a bead that extends down into the wheel rim and lies flat against the side wall thereof;

said inclined side walls supporting said tread portion at an angle such that compression of the side walls under load results in inward deflection of the tread portion by an amount greater than the deflection of the side walls;

wherein said tread portion deflects under load by compressing said tire side walls, and the amount of deflection of said tread being greater than the compression of said tire side walls by an amount that is a function of the angle of inclination of said tire side walls relative to the plane of rotation of the tire; and wherein the deflection of the tread portion under load is governed by the percent of change equation:

$$\% \text{ change of } B = \frac{\Delta B}{.01B_1} = \frac{B_1 - B_2}{.01B_1} = \frac{\sqrt{(C_1-A)(C_1+A)} - \sqrt{(C_2-A)(C_2+A)}}{.01B_1}$$

in which B is the height of the tread portion above a transverse line drawn between said bead flanges; $B_1$ is the height of the unloaded tread portion; $B_2$ is the height of the loaded tread portion; $C_1$ is the length of the unloaded tire side wall; $C_2$ is the length of the loaded tire side wall; A is one-half the distance between the bead flanges; and $\Delta B$ is equal to $B_1-B_2$.

2. A vehicle tire as in claim 1, in combination with a bead locking insert which seats on the bottom of the wheel rim and exerts laterally outward pressure against said bead to hold the latter against said wheel rim side walls.

3. A vehicle tire as in claim 2, wherein said bead locking insert has portions that seat against the bottom of the wheel rim, and a pair of laterally spaced, upstanding, resilient flanges that bear against the inner surfaces of said beads.

4. A vehicle tire and bead locking insert as in claim 2, wherein said insert is H-shaped in cross-section, with two laterally spaced, upstanding, resilient flanges that bear against the inner surfaces of said beads, and two laterally spaced downwardly extending flanges that seat on the bottom of the wheel rim.

* * * * *